United States Patent [19]

Deininger

[11] Patent Number: 4,682,629

[45] Date of Patent: Jul. 28, 1987

[54] ELECTROMAGNETIC PROPORTIONAL VALVES

[75] Inventor: Horst Deininger, Horstein, Fed. Rep. of Germany

[73] Assignee: Linde Aktiengesellschaft, Wiesbaden, Fed. Rep. of Germany

[21] Appl. No.: 877,269

[22] Filed: Jun. 23, 1986

Related U.S. Application Data

[63] Continuation of Ser. No. 712,192, Mar. 15, 1985, abandoned.

[30] Foreign Application Priority Data

Mar. 16, 1984 [DE] Fed. Rep. of Germany ....... 3409643

[51] Int. Cl.$^4$ ................................................ F15C 3/06
[52] U.S. Cl. ................................... 137/625.4; 91/449; 251/129.08; 251/129.21
[58] Field of Search ............... 137/625.4, 901; 138/31, 138/43, 45, 46; 251/129.08, 129.21; 91/449, 450

[56] References Cited

U.S. PATENT DOCUMENTS

| 1,488,008 | 3/1924 | Jones . | |
| 3,552,437 | 1/1971 | Blosser et al. | 137/625.4 |
| 3,861,644 | 1/1975 | Knape | 251/129.21 |
| 3,982,554 | 9/1976 | Saito et al. | 251/129.08 |
| 4,057,216 | 11/1977 | Flaschar | 251/129 |
| 4,457,340 | 7/1984 | Krueger | 137/625.5 |

Primary Examiner—Samuel Scott
Assistant Examiner—Noah Kamen
Attorney, Agent, or Firm—Eugene F. Buell

[57] ABSTRACT

An electromagnetic proportioning valve is provided having two coils and an armature which can be displaced by either coil in one of two possible directions, in which case a seat valve on whose valve bodies the magnetic force generated in the armature acts, is located on each side of the armature.

2 Claims, 2 Drawing Figures

ELECTROMAGNETIC PROPORTIONAL VALVES

This application is a continuation of my copending application Ser. No. 712,192, filed Mar. 15, 1985, now abandoned.

BACKGROUND AND SUMMARY OF THE INVENTION

This invention relates to electromagnetic valves and particularly to an electromagnetic proportional valve.

The invention concerns an electromagnetic proportional valve with at least one solenoid and an armature displaceable in its field which acts on at least one restrictor, where this restrictor is located in a channel in which a pressure can be built up in a fluid stream fed in, in particular a magnetic valve for generating a control pressure that is dependent on an electric signal, preferably for regulating a multiway valve or a pump capable of swinging out in two directions through the neutral position and/or the motor of a hydrostatic drive unit.

Electromagnetic valves for generating a control pressure have been known to date, in which case a coil acts on an armature, which in turn acts on a restrictor. The magnetic force generally acts here against the force of a spring. The restrictor can be formed on the edges of a slide valve supported against the spring or the restrictor can be formed at the mouth of a borehole, in which case a "baffle plate" is pressed against the mouth with the force generated by the armature, so that the throttling action is more intense, the greater the magnetic force. A stream that is either prescribed by the delivery stream of a pump or is limited by a nonadjustable restrictor is fed here to the restrictor and by varying the restrictor influenced by the armature the pressure head in front of it is modified and this pressure head is used as a signal or the pressure of the oil buildup is used as the control pressure, which acts, for example, in regulating a pump either on the pilot of a servo follow-up control power amplification device or acts directly on the servo piston of the pump. If the pump is moveable through the neutral position, the control pressure has to act at will on one of the two sides of the servo piston. For this purpose, it is conceivable to provide a reversing valve in the control pressure line that conveys the control pressure to the side of the servo piston that is to be regulated. However, it is customary in this case to provide two electromagnetic valves, one of which is regulated and thus generates a control pressure in the assigned control pressure line, which acts on the corresponding side of the servo piston, while the other magnetic valve remains unaffected and consequently leaves the restrictor fully open, with the result that there is no pressure on the side of the servo piston assigned to this restrictor. Such an arrangement is very expensive with respect to both production cost and the structural space required. There is also the danger in valves in which the throttling action is produced on the edge of a slide valve that the slide valve becomes jammed, e.g., as the result of a dirt particle, so that the slide valve remains in its regulated position even if no more field is induced in the coil of the magnet. In this case it is impossible to return the pump to the zero-stroke position, or it is possible only if just as large a pressure is applied to the second side of the servo piston and thus an equilibrium of the control pressures is produced, with the further danger that if the slide valve released suddenly, only the additionally applied control pressure acts and the pump shoots into a position that is not desired at all.

It is also known to have the two armatures act, each through a push rod on each an arm to a two-arm lever, which is in turn connected with a third lever arm with the slide valve that is capable of moving in two directions.

The invention proposes an electromagnetic valve of the above type, which facilitates building up a desired control pressure in one of two selectively regulatable pressure channels, preferably control pressure channels, at a low construction cost, and also eliminating the said disadvantages.

This goal is accomplished by the combination of the following features:

(a) Two spools are located in a common housing and they act in one direction on a single common armature body, in which case two restrictors located one on each side of this one armature body are assigned to it.

(b) Each restrictor is designed as a seat valve.

The statement that an integrated armature body is present does not exclude the fact that this armature body is not uniform and has a contraction approximately in the middle, and does not exclude the fact that this one armature body is comprised of two or more work pieces.

The seat valve can be designed as a ball valve, but also as any other known type of seat valve.

Through the implementation form a relatively small valve for two selectively regulatable control pressures is offered, which due to its compact form is suitable for incorporation as a "building block" in an "assembly of prefabricated machine parts" on pumps or multiway valves, e.g., block control devices of various types and sizes. The pumps or multiway valves that are provided for remote hydraulic control through a control pressure can be used unchanged or with only slight changes, where now instead of a hydraulic signal, an electric signal is sent to the valve or pump and the electric signal is converted at the pump into a fluidpressure signal proportional to the electric signal.

The implementation form also has various advantages:

When the armature hangs up in an actuation direction, opposite force can be exerted by applying an electric voltage to the other coil, which draws the magnet toward the neutral position. This magnetic force acts in addition to the force that results in the restrictor designed as a seat valve as a result of the pressure built up in front of it. The operational reliability is increased through this possibility of intervention or the possibility of back-regulation when there is a seizing of the moving parts of the control mechanism.

Since the force of the electromagnet acts on a small-dimension seat valve, the use of very small forces along with a high operating reliability is possible. It is thus possible to get along with very weak electric signals, i.e. very small electric currents.

The use of seat valves also has advantages over the use of throttling at the edges of an axially displaceable slide valve inasmuch as the danger of seizing is eliminated or at least substantially reduced and a force is generated directly on the seat valve body and acts against the force of the electromagnet so that an additional spring is not required. During counter-control in the case of seizing, this force acts together with the magnetic force.

Through the use of the "building block" offered by the invention it is possible to retain the design of pumps and multiway valves with remote hydraulic control without substantial change, i.e., no mechanical answer-back signal of the pump swing angle or of the displacement position of the piston of the multiway valve is necessary. In this manner, a simple expansion of hydraulically adjustable units to electrical control is possible by flanging on the valve according to the invention.

BACKGROUND AND SUMMARY OF THE INVENTION

The mode of construction is very simple. The construction cost is low with respect to both production costs and space requirement (space necessary for incorporation).

An advantageous electrohydraulic signal transmitter is thus offered by the invention.

A hydraulic servo valve controlled through an electromagnet is also known, in which two coils are located at a borehole and they draw an armature body selectively in one or the other direction. A valve slide lies against this armature body under the action of the force of a spring, in which case the space in which the valve slide lies against an extension of the armature body must be kept pressure-free in order to avoid interferences. In this familiar arrangement it is thus impossible to exert a force on the valve body in one direction by counter-regulation when the valve slide seizes, or it is possible only if the valve slide seizes in a position shifted toward the magnetic armature body, and this force is then not added to a hydraulic force. None of the advantages of the present invention are achieved with this valve.

If an armature body is shifted by the field generated in an electromagnetic coil against the force of a spring and determines the spacing of a baffle plate from a nozzle mouth by this displacement path, a build-up effect can also be achieved thereby, one that is a function of the magnitude of the magnetic field and thus the electric signal. In this case, however, a displacement is induced as a function of the electric signal, namely the displacement path of the spring, and this displacement path determines the spacing of the baffle plate from the nozzle mouth and thus the discharge cross section. In contrast, in the arrangement according to the invention the pressure control as a function of the electric signal is achieved with only an extremely short path, where the force generated by the magnetic field acts directly on the seat valve and counteracts the force produced by the fluid pressure, such that an equilibrium arises between the magnetic force and the force of the controlled pressure acting on the valve body, in which case this force produced by the pressure can cooperate in the manner described during regulation in the opposite direction for release in the case of a possible seizing. This immediate generation of a force equilibrium thus not only offers advantages over the roundabout way through the induction of a displacement during the development of an equilibrium with the force of a spring, with respect to production and construction costs, because the spring, whose characteristics cannot be adjusted so precisely, is abolished, but also in that all the disturbances that can be involved with a displacement that always causes friction are eliminated. In the arrangement according to the invention the displacement is just enough so that the width in the throughflow gap is modified. Each of the two end faces of the armature body can lie here directly in front of the mouth of a borehole carrying the pressure medium, in which the pressure dependent on the electrical signal is to be built up.

In the foregoing general description of the prior art and of this invention I have set out certain objects, purposes and advantages of this invention. Other objects, purposes and advantages of this invention will be apparent from a consideration of the following description and the accompanying drawings in which.

DETAILED DESCRIPTION OF THE INVENTION

Figure 1:
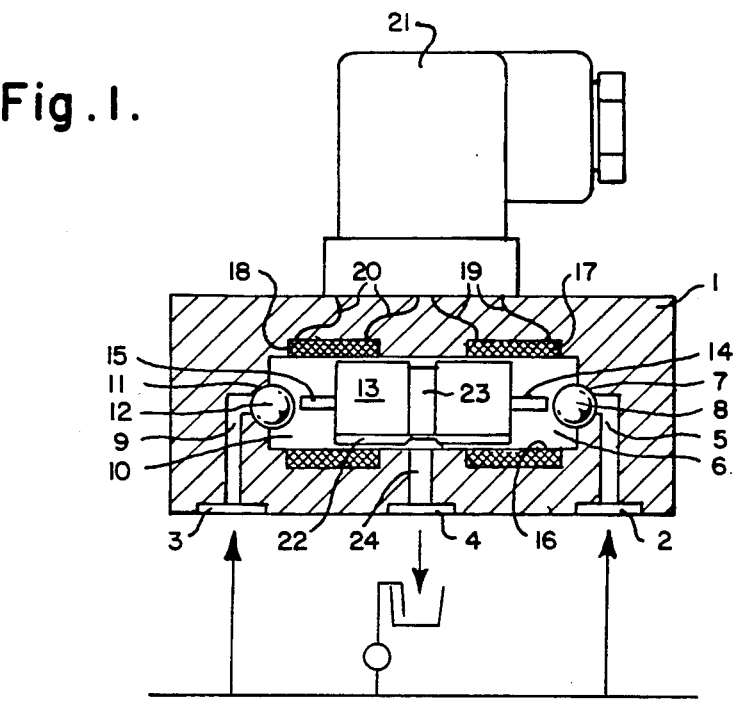
FIG. 1 shows a valve according to the invention in cross section.

The housing 1 is provided with three hydraulic connections 2, 3 and 4. A predetermined oil stream of 0.5 liters per minute, for example, is fed from a source by a conduit to connection 2 during operation and an oil stream of equal size is fed from a source by a conduit to connection 3. Connection 4 is connected with a pressureless tank.

Connection 2 passes into a channel 5, whose mouth is designed in the internal space 6 as a seat 7 for the valve ball 8. In the same manner the connection 3 goes over into a channel 9, whose mouth in the inner chamber 10 is shaped as a seat 11 for the valve ball 12. The inner chambers 6 and 10 are parts of a traversing borehole 12 in which an armature body 13 is capable of moving and has a projection 14 or 15 on each side. The dimensioning here is such that if the valve ball 8 is sitting in its seat 7 and the valve ball 12 is sitting in its seat 11, a free space remains between the valve ball 8 and the end face of the projection 14 and between the valve ball 12 and the end face of the projection 15.

Two valve spool coils 17 and 18 are located around the borehole 12, of which coil 17 is connected by two electric leads 19 and coil 18 by two electric leads 20 with an electric signal transmitter 21.

The armature body 13 has an axial longitudinal groove 22 on at least one side of its periphery and has a contraction 23 in its middle section that lies in front of the mouth of the channel 24 connected with the connection 4 in any possible position of the armature body 13. It is thus achieved that the pressure prevailing in the connection 4 leading to a pressureless tank (not shown) is present in both the inner chamber 6 and the inner chamber 10.

The mode of operation is as follows: If the coil 17 is energized with voltage through the lead 19, the armature body 13 presses with its projection 14 against the valve ball 8. On the other hand, the fluid pressure present in channel 5 acts against this, with the result that an equilibrium state will set in for the position of the valve ball 8, in which the throttle gap at the valve seat 7 is sufficiently large that the force of the pressure built up in the channel 5 is equal to the magnetic force exerted by the coil 17 on the armature body 13.

Figure 2:
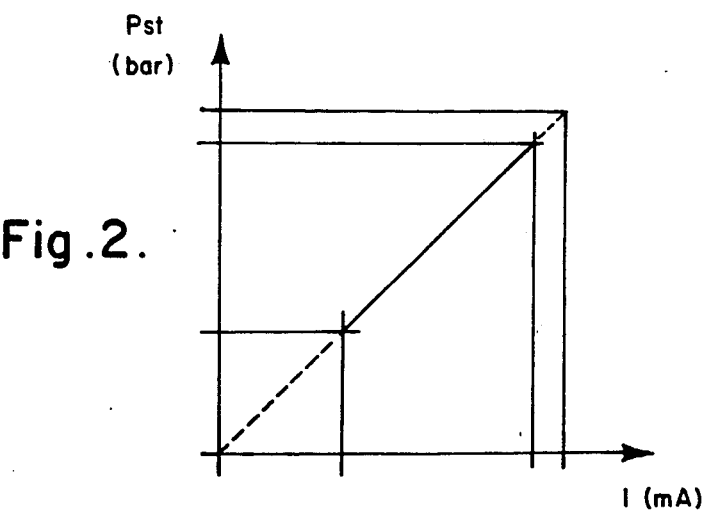
FIG. 2 shows a functional diagram thereof.

The current 1 in milliamperes flowing through the coil 17 is plotted on the abscissa in FIG. 2 and the control pressure in bars present in the channel 5 is plotted on the ordinate. It can be seen here that the control pressure increases linearly with the current and thus a proportional valve action is obtained.

The same effect occurs if the coil 18 is energized with voltage through the leads 20 and a force is thus exerted on the armature body 13 that causes the armature body 13 to press against the valve ball 12 with its projection 15. A seizing of the valve balls 8 or 12 should not occur. If the armature body 13 should hang up, a force can be generated by applying a voltage to the other coil 17 or 18 that draws the armature body 13 back into the neutral position.

The spacing of the end faces of the projections 14 and 15 from each other is dimensioned relative to the position of the valve seats 7 and 11 and the diameter of the valve balls 8 and 12 so that the latter balls 8 and 12 cannot fall out of their seats.

The invention thus concerns an electromagnetic proportional valve in which two coils, but only one armature on which the two coils act alternatively are provided in a housing, in which case the armature acts on a restrictor on each of its two displacement sides. It is possible here to design the restrictors as seat valves as an additional refinement. However, the invention also concerns an electromagnetic proportional valve in which a seat valve is provided as a restrictor. As a further refinement, it is possible here to have two such seat valves acting as restrictors in one housing and have an armature body, on which the two coils act, between them.

The force generated by the coils on the armature can act directly on the valve body of the seat valve or indirectly through a spring.

In the foregoing specification I have set out certain preferred practices and embodiments of my invention, however, it will be understood that this invention may be otherwise embodied within the scope of the following claims.

I claim:

1. An electromagnetic proportional valve comprising a housing, a bore in said housing, an inlet at each end of said bore, conduit means connecting each inlet to sources delivering fluid at constant flow rates, an exhaust outlet intermediate the ends of said bore, an electromagnetic coil adjacent each end and surrounding said bore, an armature in said bore movable longitudinally thereof, groove means on said armature communicating between said inlet and said outlet to equailize the pressure on opposite ends of the armature, valve means between said armature and each inlet, electrical proportional control means connected to each coil for selectively energizing said coils to move the armature to apply force against one or the other of said valve means at each inlet wherein flow will be restricted at the inlet of said one or the other valve means, thereby proportionally controlling pressure within the conduit means associated with the inlet being restricted.

2. An electromagnetic proportioning valve as claimed in claim 1 wherein each valve means is a ball.

* * * * *